United States Patent

Hage et al.

[11] 3,892,045
[45] July 1, 1975

[54] FUEL ALLOCATION SYSTEM AND METHOD FOR INDUSTRIAL DRYERS AND THE LIKE

[75] Inventors: William T. Hage, Orlando; Emanuel J. Elliott, Altamonte Springs, both of Fla.

[73] Assignee: Mechtron International Corporation, Orlando, Fla.

[22] Filed: May 10, 1974

[21] Appl. No.: 468,993

[52] U.S. Cl. .......................... 34/28; 34/44; 432/36; 432/37
[51] Int. Cl. ............................................. F26b 3/00
[58] Field of Search ............... 34/28, 44, 52, 43, 50; 432/36, 37

[56] References Cited
UNITED STATES PATENTS

| | | | |
|---|---|---|---|
| 3,259,995 | 7/1966 | Powischill | 34/50 X |
| 3,269,715 | 8/1966 | Wellford, Jr. | 432/37 |
| 3,787,985 | 1/1974 | Fowler et al. | 34/28 |

Primary Examiner—John J. Camby
Attorney, Agent, or Firm—Duckworth, Hobby & Allen

[57] ABSTRACT

A fuel allocation system and method includes means, such as a mass flow meter, for measuring the mass flow rate of a moving material and providing an output representative thereof. Means are also provided, such as a moisture gauge, for measuring the amount of moisture in the material to provide a second output. The rate of the heat applied to the material is then regulated responsive to the first and second outputs. In one embodiment the heating capacity of the fuel is instantaneously compared with the heat requirements of the material necessary to raise the output temperature to a preselected level, in order to provide a signal for controlling the rate of fuel flow.

26 Claims, 3 Drawing Figures

FUEL ALLOCATION SYSTEM AND METHOD FOR INDUSTRIAL DRYERS AND THE LIKE

BACKGROUND OF THE INVENTION

1. Field of the Invention

The present invention relates to systems and methods for measuring an indicia of a material in order to regulate a given work function. In particular, the present invention relates to systems and methods for regulating the amount of fuel for industrial dryers responsive to the mass flow rate, and the temperature and moisture content of the material being dried.

2. Description of the Prior Art

Industrial dryers presently used for drying aggregate materials for the construction and roadbuilding industries generally includes a heater having a fuel control which may be manually adjusted to regulate the amount of fuel supplied to the burner elements.

Dryers of this type are frequently employed at the construction site, and are therefore subjected to widely varying ambient conditions. Specifically, the amount of moisture contained in the aggregate and the ambient temperature can vary greatly the amount of heat, and thus fuel, required to effect the drying operation. Further, the amount of fuel required is also dependent on the mass of the aggregate and the mass flow rate, when the aggregate is moving through the dryer during the drying operation. It is therefor desirable to provide means for regulating the amount of fuel to the dryer burner, which means is automatically responsive to these ambient conditions.

Presently, it is the practice to control the heat rate in the dryer in proportion to the deviation of the output temperature of the aggregate with respect to a present level.

There are suggestions in the prior art for controlling a work function responsive to changes in the ambient conditions of the work material. In U.S. Pat. No. 2,546,891, there is disclosed a combination of a flow rate and temperature measuring means in pasteurizing apparatus. U.S. Pat. No. 2,764,894 teaches a technique for measuring the temperature and salinity of water. In U.S. Pat. Nos. 3,354,716 and 3,616,689, there are disclosed flow rate meters, the latter reference also teaching a temperature gauge in combination therewith. See also U.S. Pat. No. 3,332,153.

Additionally, there is disclosed at page 72 of the Sept. 1, 1973 issue of ELECTRICAL WORLD, a system for computing the heat requirements of a power plant.

SUMMARY OF THE INVENTION

The present invention contemplates a system for regulating the amount of heat in a dryer adapted for drying a moving mass of an aggregate material, in which the system includes means for measuring the mass flow rate of the aggregate and providing a first output representative thereof. Means are also included for measuring the amount of moisture in the aggregate and providing a second output representative thereof, along with means for regulating the heat in the dryer responsive to the first and second outputs.

The present invention also contemplates a method for regulating the rate of heat applied in a dryer of the type described. In particular, this method comprises the steps of measuring the mass flow rate of the moving aggregate and providing an output representative thereof, and measuring the amount of moisture in the material, and providing a second output representative of the moisture level. The amount of heat in the dryer is then regulated responsive to these two outputs.

In other arrangements the basic system and method of the present invention may employ additional sensors and means for automatically comparing the heating capacity-flow rate product of the fuel with respect to the amount of heat required to raise the heated material to a preselected temperature.

THE DRAWING

DETAILED DESCRIPTION

EXAMPLE ONE

Figure 1:
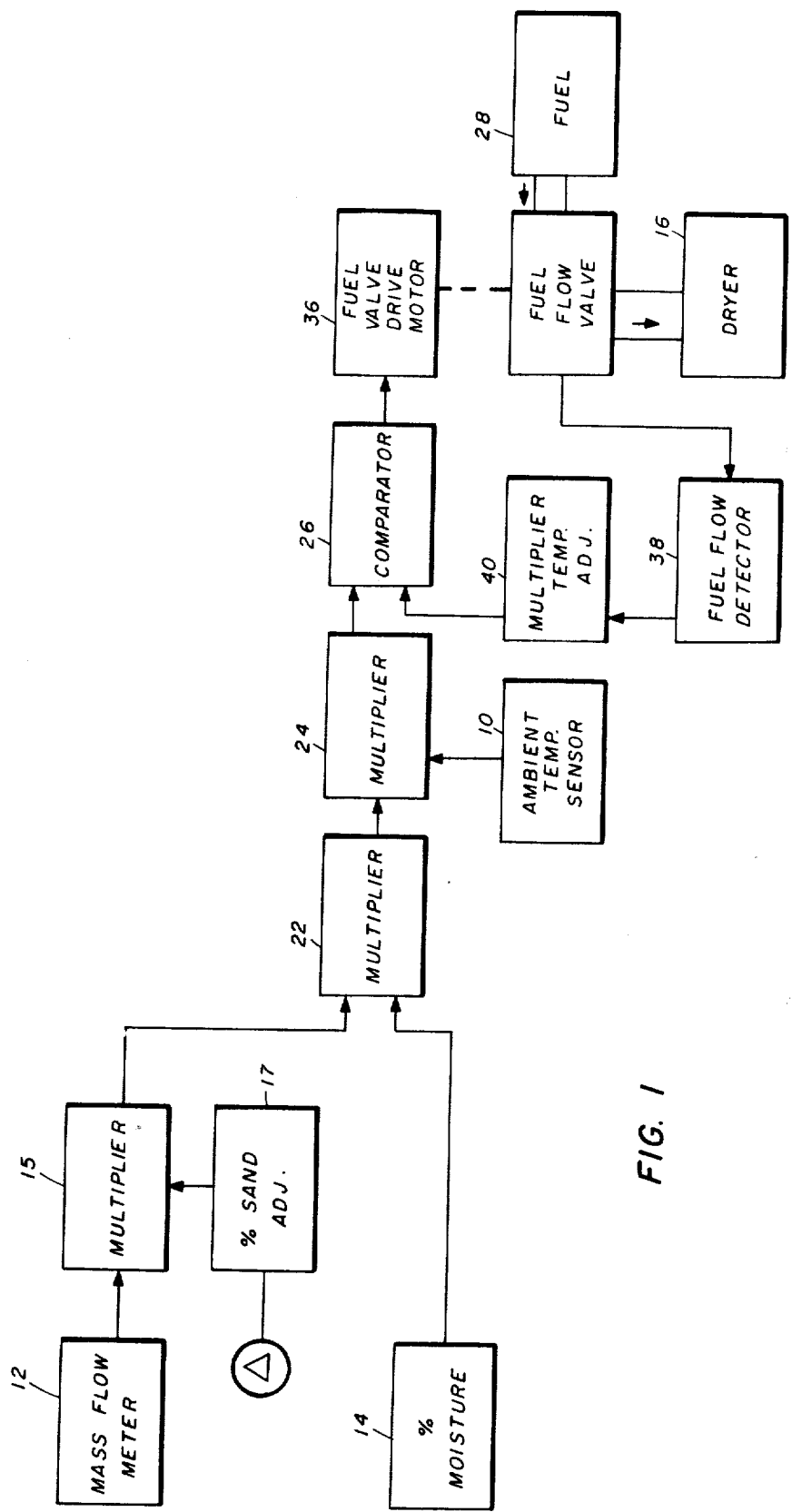
FIG. 1 is a block diagram illustrating the component parts of one embodiment of a system in accordance with the present invention.

An embodiment of a system in accordance with the present invention, which system also embodies the method herein, is shown in FIG. 1 and described with reference thereto.

The system is adapted for use with an industrial dryer of the type described above, in which an aggregate, such as sand or stone, is caused to flow across a conveyor or similar moving means into a dryer where the aggregate is dried and heated.

The system includes an ambient temperature gauge 10, a mass flow meter 12, and a moisture gauge 14. The temperature and moisture gauge 10, 14 may be disposed in the storage facility for the aggregate to be heated. The mass flow meter 12 may be disposed on the conveyor or other means, which is employed to move the aggregate from the storage facility to the dryer. Each of these component parts do not, per se, constitute a part of the present invention and are therefore not described in detail. Suitable temperature, mass flow and moisture gauges are commercially available. For example, a variety of temperature gauges are available; mass flow meters manufactured by Ramsey Engineering Co., under the trademark VEY-R-WEIGH; and moisture gauges manufactured by Sever Hill Co., Stock No. MM 32012 may be employed.

The mass flow meter 12 and the moisture gauge 14 provide respective inputs 18, 20 to a multiplier circuit 22. The mass flow rate output of the meter 12 may be measured only with respect to a portion of the aggregate, for example, sand, and adjusted by means of manual setting 17 through a multiplier 15. The ambient temperature gauge provides an input to another, third multiplier circuit 24. The multiplier circuit 22 likewise provides an input to the multiplier circuit 24. The output of the third multiplier circuit 24, in turn is fed to one input of a comparator circuit 26.

The heater 16 further includes a fuel source 28 provides a fuel input via piping to the dryer 16. A fuel flow control valve 30 is interposed along the fuel input and is controlled by a valve drive motor 36. The valve drive motor 36 is controlled by an output from the comparator circuit 26. A fuel flow valve position detector 38, detects the position of the motor 36 to provide an input to a multiplier circuit 40, which in turn provides a feedback input into the comparator circuit 26.

In operation, the temperature and moisture content of the aggregate is measured, and the aggregate is moved along a conveyor or similar moving means along which is disposed the mass flow meter 12. These respective gauges and meters 10, 12 and 14 provide the respective inputs to the multiplier circuits 15, 22 and 24. The multiplier circuit 22 provides an output which is representative of the product of the input from the mass flow meter 12 and the moisture gauge 14, and provides an output to the multiplier circuit 24.

In accordance with an important aspect of the present invention, it has been recognized that the amount of fuel required to effect the drying operation in the dryer 16 is directly proportional to the product of the mass flow rate and percent moisture of the aggregate.

Accordingly, the output of the multiplier circuit 22 representing the product of the measured mass flow rate and the percent moisture is modified by the measured ambient temperature in the multiplier 24, and then is fed into the comparator circuit 26, where that product is compared with the fed back input from the valve position detector 38. If no difference between these signals is detected, then no error signal is transmitted to the valve drive motor 36. However, if a differential is detected between the product output from the multiplier circuit 24 and the output of the fuel flow meter 38, then the comparator circuit 26 feeds an appropriate control signal to the valve drive motor 36 to effect a change in the valve position and either reduce the amount of fuel flowing from the fuel reservoir 28, or increase the amount of fuel flowing, as required. In this way, the amount of fuel can best be allocated with respect to the requirements for drying the aggregate in the dryer 16.

Figure 2:
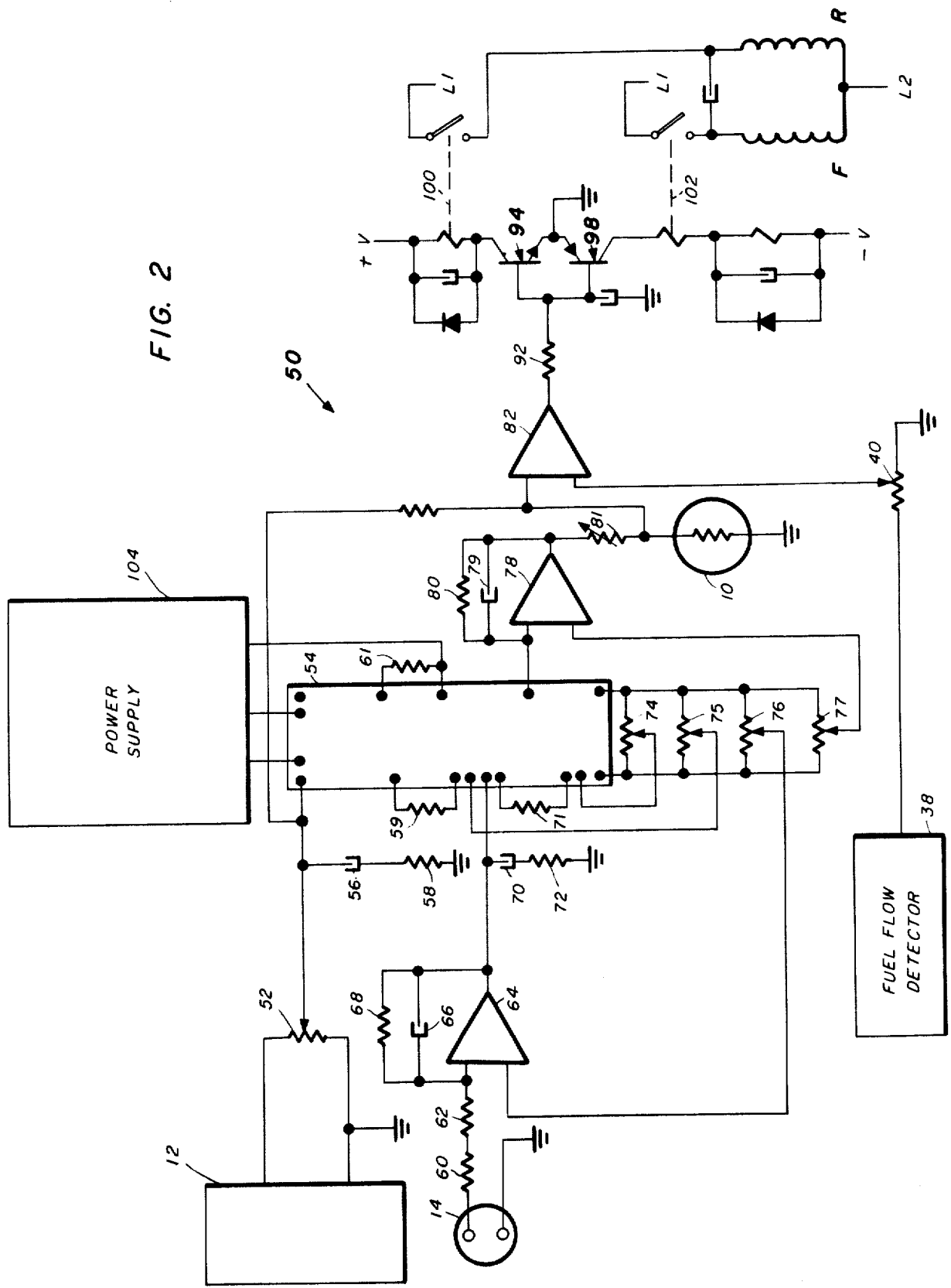
FIG. 2 is a schematic circuit diagram illustrating an embodiment of an electronic circuit comprising a portion of the system shown in FIG. 1.

A specific example of a circuit incorporating the multiplier 15, 22 and 24, the comparator 26 and the final temp adjustment circuit 40, is shown in FIG. 2 and described with reference thereto.

The circuit, referred to generally as 50, includes circuit components depicted by commonly accepted symbols. Specific circuit values for these components as employed in this embodiment are set forth in the attached appendix. It will be understood by those skilled in the art that other components and valves therefor may be employed without departing from the scope of the present invention.

Referring now to FIG. 2, the input 18 from the mass flow meter 12 is fed into a potentiometer 52, the wiper of which is coupled to an integrated multiplier circuit 54. A serially connected capacitor 56 and resistor 58 combination is coupled to the wiper of the potentiometer 52 to provide a low impedance shunt to ground for spurious alternating currents and RF noise. The output 20 from the moisture gauge 14 is serially connected through two resistors 60, 62 to the positive input of an operational amplifier 64, having a parallel connected capacitor 66 and resistor 68 connected in the feedback circuit thereof. The output of the operational amplifier 64 is likewise coupled to the integrated multiplier circuit 54. A low impedance capacitor 70 resistor 72 combination, coupled to the output of the operational amplifier, provides a similar shunt path for spurious noise.

The positive output of the multiplier circuit 54 is coupled to the positive input of an operational amplifier 78. The multiplier circuit 54 further includes a variable impedance network, including four potentiometers 74, 75, 76 and 77 coupled as shown in FIG. 2. Potentiometers 74 and 75 provide initial zero adjustment, and potentiometer 76 provides a moisture balance with respect to the negative input of the operational amplifier 64. Potentiometer 77 provides an output balancing adjustment, which is fed into the negative input terminal of the operational amplifier 78.

The output of the operational amplifier 78 is fed through a trimming potentiometer 81 to the positive input of a comparator circuit 82. The output of the operational amplifier 78 is likewise coupled through the ambient temperature sensor 10 to ground. Thus, connected, the potentiometer 81 and temperature sensor 10 serve as an "inverse divider", or multiplier.

The fuel flow detector 38 is coupled to the negative input of the comparator circuit 82 through a potentiometer, serving as the final temperature adjustment multiplier circuit 40 of FIG. 1. The output of the comparator circuit 82 is coupled through a resistor 92 to a differential transistor amplifier pair including a PNP transistor 94 and an NPN transistor 98. Each respective transistor 94, 98 is likewise coupled to a corresponding relay switch 100, 102 which in turn control the respective forward F or reverse R windings of the drive motor 36. One terminal of the multiplier 54 is coupled to the comparator 82 to offset a zero output, in the event the aggregate does not contain a measurable amount of moisture.

Appropriate biasing voltages are supplied by a power supply referred to generally as 104 in FIG. 2.

In the operation of the circuit of FIG. 2, the comparator 82 receives the respective heat required input and compares this input with the feedback signal from the fuel flow detector 38, and adjusts the fuel rate in the manner described above.

EXAMPLE TWO

Figure 3:
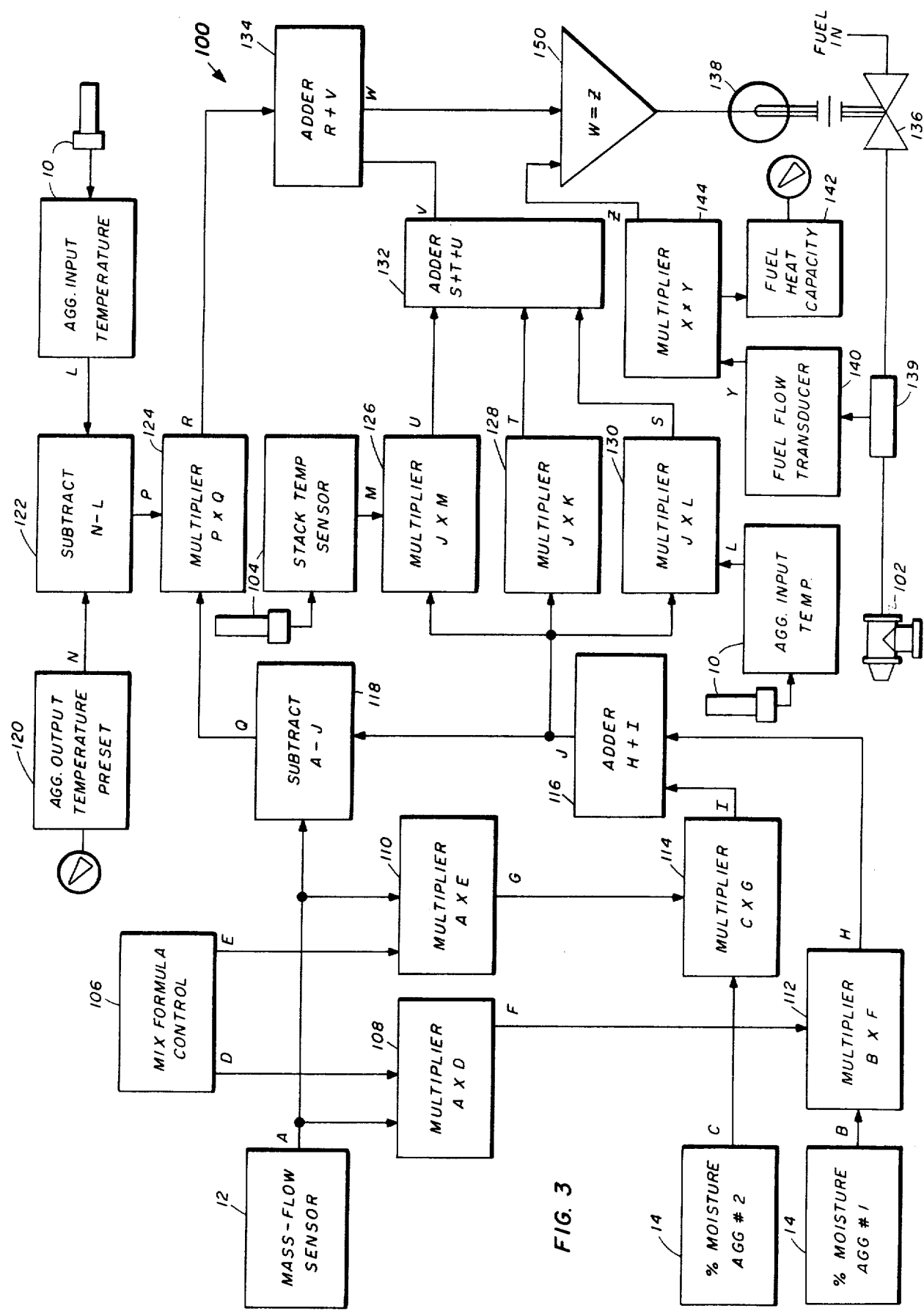
FIG. 3 is a block diagram illustrating another embodiment of the system of the present invention.

A second embodiment of a system in accordance with the present invention is shown in FIG. 3 and described with reference thereto.

This second embodiment, referred to generally as 100, is similar to the basic system of FIGS. 1 and 2, and includes multiplier and comparator circuits as described above. This system 100 further includes additional sensors and inputs for refining the operation of the system and thereby effecting an optimum in fuel efficiency.

Noting FIG. 3, the system 100 includes a plurality of circuit components which are illustrated in block diagram form. For clarity, the output of each block is given a letter designation, which designations are set forth below.

A = mass flow rate
B = percent moisture in first aggregate
C = percent moisture in second aggregate
D = first output from aggregate mix controller
E = second output from aggregate mix controller
F = mass flow rate of first aggregate
G = mass flow rate of second aggregate
H = moisture content, by weight in first aggregate
I = moisture content, by weight in second aggregate
J = sum of moisture content in first and second aggregates
K = constant value of heat necessary to convert unit of water at 212° F. to steam at 212° F.
L = measured input aggregate temperature M = measured stack temperature
N = desired output aggregate temperature
P = temperature differential between input and output aggregate temperatures
Q = flow rate of dry aggregate; i.e., without included moisture
R = heat required to raise dry aggregate to desired output temperature
S = heat required to raise total moisture (J) to 212° F.
T = heat required to convert total moisture, as water at 212° F., to steam at 212° F.
U = heat required to raise total moisture, as converted to steam, to stack temperature
V = total heat required to convert total moisture from water at ambient input temperature to steam at stack temperature
W = sum total of heat required to raise aggregate to desired output temperature and total moisture from water to steam
X = preselected heat capacity of fuel (BTU/ft$^3$)
Y = rate of fuel flow through fuel control valve
Z = instantaneous heat capacity of fuel The system 100 includes the mass flow meter 12, percent moisture gauge 14 and aggregate ambient temperature gauge 10 described above in Example One. Additionally, this system 100 is adapted for use in industrial dryers 102 of the type wherein the dryer includes a stack (not shown) for exhausting hot gases. The system 100 therefore includes a temperature sensor 104 for measuring the temperature in the stack.

Further, the system 100 is adapted for use with industrial dryers of the type having a plurality of aggregate feeds, in which different aggregate sizes may be drawn from separate bins and thereafter mixed in the dryer. To this end, at least one additional percent moisture gauge 14' is provided. A mix formula control circuit 106 is also provided to control the percent of each aggregate to the total flowing into the dryer 102.

In the system 100, the output A of the mass flow sensor 12 is multiplied at 108 and 110 by the percent outputs of the mix control circuit 106, to thereby effect respective outputs F and G from the multipliers 108 and 110 which reflect the respective mass flow rates of aggregate from each supply source. The output F of the multiplier 108 is then fed into another multiplier 12, where that output is multiplied by the amount of moisture measured in the corresponding aggregate. In a like manner, output G of the multiplier 110 is multiplied at 114 by the percent moisture in the corresponding aggregate. The outputs H and I of the two multipliers 112, 114 are then added at 116, providing an output J which represents the amount of mass flowing along the aggregate flow path which is attributable to the moisture in the aggregates. This output J is thereafter subtracted from the total mass output A from the mass sensor 12 at difference measuring circuit 118.

The system 100 is further provided with means, which may comprise a potentiometer, for adjusting the desired temperature of the aggregate out of the dryer 102, thereby providing an output N corresponding to that desired final aggregate temperature. The aggregate temperature sensor output L, which determines the temperature of the aggregate prior to entering the dryer, is subtracted from the output N in the difference measuring circuit 122, providing an output P representative thereof. The output P is multiplied by the output Q of the difference determining circuit 118 in multiplying circuit 124, thus providing an output R which represents the amount of heat required to raise the temperature of the aggregate, less the included water, from its initial temperature to a desired final temperature.

Referring to the center of FIG. 3, the output of the adding circuit 116 is fed to three multiplier circuits 126, 128 and 130. The multiplier circuit 130 receives the output L from the initial aggregate temperature sensor 10, and multiplies this output by the output J from the adder circuit 116. The resulting output S represents the amount of heat required to raise the temperature of the total water to 212° F. The multiplier circuit 128 multiplies the output J by a constant K, which represents the amount of heat required to convert a unit of water at 212° F. to steam at 212° F. The output T from the multiplier circuit 128 represents the heat required to perform that function. The multiplier circuit 126 receives an output M from the stack temperature sensor, and multiplies the output J by that signal. The resulting output U represents the amount of heat, in BTUs, required to raise the total amount of moisture, as steam, from 212° F. to the temperature of the stack. The outputs S, T and U are then summed in an adder circuit 132, the output V of which is added to the output R in adder circuit 134. The resulting output W thus comprises a first input to a comparator circuit 150.

As described above with respect to Example One, the dryer 102 includes a fuel source from which fuel flows to a control valve into the dryer. In the system 100, the fuel valve is controlled by a positioning motor 138. Further, the system 100 is provided with an oil flow transducer 139 along the flow path. This transducer provides an input to a flow transducer signal processor 140, which produces an output Y corresponding to the amount of fuel flowing through the control valve 136. The system 100 is further provided with means, which again may be a potentiometer, for providing a variable adjustment representative of the heat capacity of the fuel, BTU/ft$^3$, or equivalent unit. This circuit 142 provides an input to a multiplier circuit 144, where the signals X and Y are multiplied to provide an output Z which represents the total heat capacity of the fuel entering the dryer 102. The output Z is fed into the comparator circuit as the second output thereto.

In the operation of the system 100, aggregate from one or two supply sources are fed into the dryer 102. The flow rate of the aggregate is measured, as is the percent moisture in each aggregate source. These signals are processed in the manner described above, such that the output R represents only the heat required to raise the dry aggregate to the desired temperature, as preset at 120, from its original temperature. In a corresponding manner, the output V represents the amount of heat required to raise the moisture in the aggregate to a temperature sufficient to insure that all of the moisture included in the aggregate is converted to steam and driven out of the stack. The sum total of heat required, represented by output W, is then compared with the heat capacity of the fuel, and if additional heat is required to effect a complete drying, an error signal is generated as an output from the comparator 150 to the valve positioning motor 138. The valve positioning motor 138 then opens the valve 136, providing additional fuel to the dryer and thus an increase in heat capacity. Alternatively, if the comparator determines that the total heat capacity of the fuel into the dryer is greater than that required to effect the raising of the aggregate to the desired temperature and the converting of the included moisture to steam at the stack temperature, then an error signal is sent to the valve positioning motor 138 to close the valve 136, and thus reduce the amount of fuel flowing therethrough. In this way, a most efficient utilization of the fuel is accomplished.

APPENDIX - FIG. 2

| Element | | Component |
|---|---|---|
| 40 | 0–20 K ohm | Potentiometer |
| 52 | 0–15 K ohm | Potentiometer |
| 54 | Multiplier | MC-1594 or equivalent |
| 56 | 10 p.f. | |
| 58 | 510 ohm | |
| 59 | 3 ohm | |
| 60 | 2000 ohm | |
| 61 | 16 K ohm | |
| 62 | 2700 ohm | |
| 64 | Fairchild uA741 or equivalent | |
| 66 | 10 p.f. | |
| 68 | 47 K ohm | |
| 70 | 10 p.f. | |
| 71 | 6 K ohm | |
| 72 | 510 ohm | |
| 74 | 0–20 K ohm | Potentiometer |
| 75 | 0–20 K ohm | Potentiometer |
| 76 | 0–50 K ohm | Potentiometer |
| 77 | 0–50 K ohm | Potentiometer |
| 78 | Fairchiled UA741 or equivalent | |
| 79 | 10 p.f. | |
| 80 | 4700 ohm | |
| 81 | 0–20 K ohm | Potentiometer |
| 82 | Amplifier | 3029 or equivalent |
| 84 | | Zener Diode or equivalent |
| 86 | | Zener Diode or equivalent |
| 88 | 1 K ohm | |
| 90 | 1 K ohm | |
| 92 | 2700 ohm | |

I claim:

1. In combination:
   means for measuirng the mass flow rate of a moving material and providing a first output representative thereof;
   means for measuring the amount of moisture in said material and providing a second output representative thereof;
   means for heating said material; and
   means for regulating said heating means responsive to said first and second outputs.

2. The combination recited in claim 1 wherein said regulating means comprises means for receiving said two outputs and providing an electrical signal representative of the product of said two outputs.

3. The combination recited in claim 2 wherein said regulating means further comprises:
   means for providing an electrical signal representative of the amount of heat capacity of said heating means;
   means for comparing said electrical signals; and
   means for controling the amount of heating energy supplied to said heating means responsive to an output from said comparing means.

4. The combination recited in claim 3 further comprising:
   means for measuring the ambient temperatures of said material prior to entering said heating means; and
   means coupled with said ambient temperature measuring means for altering said comparing means output responsive to changes in said ambient temperature.

5. The combination recited in claim 3 further comprising means for varying the level of said signal representative of the amount of heat in said heating means.

6. The combination recited in claim 3 wherein said controlling means comprises:
   a fuel input to said heating means;
   a valve interposed in said fuel input; and
   means for controlling said valve to thereby regulate the amount of fuel into said heating means.

7. The combination recited in claim 6 wherein said valve controlling means comprises a drive motor coupled to said valve.

8. The combination recited in claim 7 wherein said heat-amount electrical signal providing means comprises means for providing an electrical signal representative of the position of said motor relative to said valve.

9. A system for regulating the amount of heat in a dryer adapted for processing a moving aggregate, said system comprising:
   means for measuring the mass flow rate of said moving aggregate and providing a first output representative thereof;
   means for providing a second output representative of the heating capacity of fuel being supplied to said dryer;
   means for comparing signals proportional to first and second outputs and providing a signal representative of the difference between said proportional signals; and means for regulating fuel flow to said dryer responsive to said difference signal output from said comparing means.

10. The system recited in claim 9 further comprising means for measuring the percent of moisture in said aggregate and providing an output representative thereof.

11. The system recited in claim 10 further comprising first multiplying means for multiplying said first output from said mass flow measuring means and said output from said percent moisture means, and for providing a first multiplied signal representative thereof.

12. The system recited in claim 11 further comprising means for determining the mass of moisture in said aggregate.

13. The system recited in claim 12 wherein said moisture mass measuring means comprises means for determining the magnitude of the difference between said first output and said first multiplied signal and providing a first difference signal representative thereof.

14. The system recited in claim 13 further comprising means for preselecting a temperature of said aggregate prior to movement through said dryer.

15. The system recited in claim 14 further comprising means for preselecting a temperature of said aggregate after movement through said dryer.

16. The system recited in claim 15 further comprising means for determining the temperature difference of said aggregate prior to and after movement through said dryer, and providing a second difference signal representative thereof.

17. The system recited in claim 16 further comprising second multiplying means for multiplying said first and second differential signals, and providing a second multiplied signal representative thereof.

18. The system recited in claim 17 wherein said dryer includes an exhaust stack for exhausting hot gases during drying of said moving aggregate, said system further comprising means for sensing the temperature in said stack, and for providing an output signal representative thereof.

19. The system recited in claim 18 further comprising means for calculating the heat required to raise the moisture in said aggregate to the temperature measured in said stack.

20. The system recited in claim 19 wherein said calculating means comprises:
   third multiplying means for multiplying the first multiplied signal by the signal output from said stack temperature measuring means;
   fourth multiplying means for multiplying the first multiplied signal by a constant representing the amount of heat required to convert a unit weight of water of 212° F. into steam at 212° F.;
   fifth multiplying means for multiplying the first multiplied signal by the output of said means for measuring the temperature of said aggregate prior to movement through said dryer;
   first adding means for adding the outputs of said third, fourth and fifth multiplying means;
   second adding means for adding the output of said first adding means with said second multiplied signals; and wherein;
   the output of said second adding means comprises said signal to said comparing means which is proportional to said first output.

21. The system recited in claim 9 wherein said multiplier includes a fuel flow valve operated by a motor, and wherein said second output means comprises means for determining the fuel flow rate through said valve and providing an output representative thereof.

22. The system recited in claim 21 further comprising:
   means for preselecting a given heat capacity value to fuel flowing through said valve; and
   means for adjusting said output from said fuel flow rate detecting means with respect to said heat capacity value.

23. The system recited in claim 22 wherein said adjusting means comprises multiplying means for multiplying said output from said fuel flow rate detector by a signal representative of said heat capacity value and providing a multiplied signal representative thereof.

24. The system recited in claim 23 wherein said multiplied signal comprises said signal proportional to said second output.

25. A system for regulating the amount of heat applied to a material to remove moisture contained therein, comprising:
   means for measuring the per cent moisture in said material and providing a first output representative thereof;
   means for measuring the temperature of said material and providing a second output representative thereof;
   heating means;
   means for delivering fuel to said heating means; and
   means for receiving said first and second outputs and controlling said fuel delivering means to allow only that amount of heat capacity in said heating means necessary to remove said moisture.

26. A method for regulating the amount of heat in a heater adapted for drying a moving aggregate, said method comprising the steps of:
   measuring the mass flow rate of said aggregate and providing a first output representative thereof:
   measuring the amount of moisture in said aggregate and providing a second output representative thereof; and
   regulating said heater responsive to said first and second outputs.

* * * * *